United States Patent
Adler et al.

(10) Patent No.: US 7,630,993 B2
(45) Date of Patent: Dec. 8, 2009

(54) GENERATING DATABASE SCHEMAS FOR RELATIONAL AND MARKUP LANGUAGE DATA FROM A CONCEPTUAL MODEL

(75) Inventors: Sharon C. Adler, East Greenwich, RI (US); Yuan-Chi Chang, New York, NY (US); Lipyeow Lim, Hawthorne, NY (US); Mirella M. Moro, Irvine, CA (US)

(73) Assignee: International Business Machines Corporation, Armonk, NY (US)

( * ) Notice: Subject to any disclaimer, the term of this patent is extended or adjusted under 35 U.S.C. 154(b) by 363 days.

(21) Appl. No.: 11/754,450

(22) Filed: May 29, 2007

(65) Prior Publication Data

US 2008/0301168 A1 Dec. 4, 2008

(51) Int. Cl.
G06F 7/00 (2006.01)
G06F 17/00 (2006.01)
(52) U.S. Cl. ...................... 707/100; 707/102
(58) Field of Classification Search ......... 707/100–102, 707/203; 717/106
See application file for complete search history.

(56) References Cited

U.S. PATENT DOCUMENTS

| | | | | |
|---|---|---|---|---|
| 7,152,073 B2 * | 12/2006 | Gudbjartsson et al. | ...... | 707/102 |
| 7,219,102 B2 * | 5/2007 | Zhou et al. | ...... | 707/101 |
| 7,467,149 B2 * | 12/2008 | Gaurav et al. | ...... | 707/101 |
| 7,512,609 B2 * | 3/2009 | McConnell | ...... | 707/100 |
| 2005/0010896 A1 * | 1/2005 | Meliksetian et al. | ...... | 717/106 |
| 2005/0138052 A1 * | 6/2005 | Zhou et al. | ...... | 707/101 |
| 2005/0165866 A1 * | 7/2005 | Bohannon et al. | ...... | 707/203 |
| 2006/0117032 A1 * | 6/2006 | Dettinger et al. | ...... | 707/100 |
| 2006/0136483 A1 * | 6/2006 | Nguyen et al. | ...... | 707/102 |

OTHER PUBLICATIONS

Al-Kamha, Embley & Liddle; Representing Generalization/Specialization in XML Schema; Proc. Of EMISA; 2005; 14 pgs.

Deutsch, Fernandez & Suciu; Storing Semistructured Data with STORED; Proc. of SIGMOD Conference; 1999; 12 pgs.

Bird, Goodchild & Halpin; Object Role Modelling and XML-Schema; A.H.F. Laender, S.W. Liddle, V.C. Storey (Eds.): ER2000 Conference, LNCS 1920; pp. 309-322; 2000; Springer-Verlag Berlin Heidelberg 2000.

(Continued)

*Primary Examiner*—Hung T Vy
(74) *Attorney, Agent, or Firm*—Jon A. Gibbons; Fleit, Gibbons, Gutman, Bongini & Bianco P.L.

(57) ABSTRACT

A method, information processing system, and computer readable medium for generating a plurality of candidate database schemas including relational and mark-up language elements. An information model comprising a plurality of entities and at least one relationship defined there between is received. The information model has been annotated with at least one semantic characteristic, operational characteristic, and evolutional characteristic. The information model that has been annotated is analyzed. A score is associated with each entity based at least in part on attributes associated with each entity. Each entity is classified as one of a relational element and a mark-up language element. The information model that has been annotated is partitioned into a plurality of relational element mappings and a plurality of mark-up language element mappings. A plurality of database schemas associated with the information model that has been annotated is generated.

20 Claims, 11 Drawing Sheets

OTHER PUBLICATIONS

Bohannon, Freire, Roy & Simeon; From XML Schema to Relations :A Cost-Based Approach to XML Storage; Proc. Of ICDE, 2002; 12 pgs.

Combi & Oliboni; Conceptual modeling of XML data; SAC, 2006 Apr. 23-27, 2006; Copyright 2006 ACM 1-59593-108-2/06/0004; 7 pgs; Dijon, Fr.

Conrad, Scheffner & Freytag; XML Conceptual Modeling Using UML; A.H.F. Laender, S.W. Liddle, V.C. Storey (Eds.): ER2000 Conference, LNCS 1920; pp. 558-571; 2000; Springer-Verlag Berlin Heidelberg 2000.

Elmasri, Wu, Hojabri, Li & Fu; Conceptual Modeling for Customized XML Schemas; S. Spaccapietra, S.T. March & Y. Kambayashi (Eds.): ER 2002, LNCS 2503; pp. 429-443; 2002; Springer-Verlag Berlin Heidelberg 2002.

Embley & Mok; Developing XML Documents with Guaranteed "Good" Properties; in Proc. of ER, 2001; 16 pgs.

Liu, Lu & Yang; XML Conceptual Modeling with XUML; ICSE '06 May 20-28, 2006; pp. 973-976; Shanghai, China, ACM 1-59593-085-X/06/2005.

* cited by examiner

300

```
CREATE TABLE person (
  pID int, name varchar(30), dob date, resume XML );
```

| pID | name | dob | resume |
|-----|------|-----|--------|
| 1001 | Melany Cross | 11/14/75 | <doc><educ>...</educ>...</doc> |
| ... | ... | ... | ... |

```
CREATE INDEX idxRes ON person(resume)
  GENERATE KEY USING XMLPATTERN
  '/doc/educ/gradschool' AS SQL varchar(50);

INSERT INTO person VALUES
  (1001, 'Melany Cross', '11/14/75',
    XMLVALIDATE (XMLPARSE('<?xml encoding="UTF-8"?>
              <doc><educ>...</educ>...</doc>')
    ACCORDING TO XMLSCHEMA ID resumes.xsd));
```

| | |
|---|---|
| REL-REL Relationship | Schema Well-known |
| XML-REL Relationship | Schema |
| A:XML 0..1 —R— 1 B:REL | if A has other relationships, create separate tables:<br>tableA(*ID int, A xml, BID int*)<br>tableB(*ID int, $b_1 type_1, \ldots, b_n type_n$*)<br>Foreign Key (tableA:BID references tableB:ID) |
| | if A has no other relationship, inline the XML entity:<br>tableB( $b_1 type_1, \ldots, b_n type_n$, *A xml*) |
| A:XML N —R— 1 B:REL | tableA(*ID int, A xml, BID int*)<br>tableB(*ID int, $b_1 type_1, \ldots, b_n type_n$*)<br>Foreign Key (tableA:BID references tableB:ID) |
| | if A has no other relationships, it can be composed into one XML document:<br>tableB(*ID int, $b_1 type_1, \ldots, b_n type_n$, SetOfA xml*) |
| A:XML 1 —R— N B:REL | tableA(*ID int, A xml*)<br>tableB(*ID int, $b_1 type_1, \ldots, b_n type_n$, AID int*)<br>Foreign Key (tableB:AID references tableA:ID) |
| A:XML M —R— N B:REL | tableA(*ID int, A xml*)<br>tableB(*ID int, $b_1 type_1, \ldots, b_n type_n$, AID int*)<br>tableR(*AID int, BID int, $r_1 type_1, \ldots, r_n type_n$*)<br>Foreign Key (tableR:AID references tableA:ID)<br>Foreign Key (tableR:BID references tableB:ID) |
| XML-XML Relationship | Schema |
| A:XML 0..1 —R— 1 B:XML | if A has other relationships, create separate tables:<br>tableA(*ID int, doc xml, BID int*)<br>tableB(*ID int, doc xml*)<br>Foreign Key (tableA:BID references tableB:ID) |
| | if A has no other relationships, it can be merged with B<br>tableB(*ID int, B xml, A xml*) |
| | tableB(*ID int, BandA xml*) |
| A:XML N —R— 1 B:XML | tableA(*ID int, A xml, BID int*)<br>tableB(*ID int, B xml*)<br>Foreign Key (tableA:BID references tableB:ID) |
| | if A has no other relationships, it can be merged<br>tableB(*ID int, $b_1 type_1, \ldots, b_n type_n$, SetOfA xml*) |
| | tableB(*ID int, BandSetOfA xml*) |
| A:XML M —R— N B:XML | tableA(*ID int, A xml*)<br>tableB(*ID int, B xml*)<br>tableR(*AID int, BID int, $r_1 type_1, \ldots, r_n type_n$*)<br>Foreign Key (tableR:AID references tableA:ID)<br>Foreign Key (tableR:BID references tableB:ID) |

| Relational Hierarchy | XML Hierarchy |
|---|---|
| PARENT RELATIONSHIP<br>1. tableA(*ID int, $a_1$ type$_1$, DID int*)<br>   tableB(*ID int, $b_1$ type$_1$, AID int*)<br>   tableC(*ID int, $c_1$ type$_1$, AID int*)<br>   Foreign Key (tableB:AID references tableA:ID)<br>   Foreign Key (tableC:AID references tableA:ID)<br>   Foreign Key (tableA:DID references tableD:ID)<br>   -- or D references A; or R1 has separate table | 1. individual tables, all entity attributes grouped into one XML column, same foreign keys. |
| 2. tableB(*ID int, $b_1$ type$_1$, $a_1$ type$_1$, DID int*)<br>   tableC(*ID int, $c_1$ type$_1$, $a_1$ type$_1$, DID int*)<br>   Foreign Key (tableB:DID references tableD:ID)<br>   Foreign Key (tableC:DID references tableD:ID)<br>   -- or D references B, C; or R1 has separate table | 2. children tables, parent and entity attributes grouped into one XML column, same foreign keys. |
| 3. tableABC(*ID int, $a_1$ type$_1$, $b_1$ type$_1$, $c_1$ type$_1$,*<br>   *memberBC char, DID int*)<br>   Foreign Key (tableABC:DID references<br>   tableD:ID)<br>   -- or D references ABC; or R1 has separate table | 3. one table, one schema for hierarchy, same FK.<br>-- XML as a column of D if entity A no other relationsip<br>-- D as column of ABC or inlined within schema, if D has no other relationship |
| CHILD RELATIONSHIP<br>1. tableA(*ID int, $a_1$ type$_1$*)<br>   tableB(*ID int, $b_1$ type$_1$, AID int*)<br>   tableC(*ID int, $c_1$ type$_1$, AID int, EID int*)<br>   Foreign Key (tableB:AID references tableA:ID)<br>   Foreign Key (tableC:AID references tableA:ID)<br>   Foreign Key (tableC:EID references tableE:ID)<br>   -- or E references C; or R2 has separate table | 1. individual tables, all entity attributes grouped into one XML column, same foreign keys. |
| 2. tableB(*ID int, $b_1$ type$_1$, $a_1$ type$_1$*)<br>   tableC(*ID int, $c_1$ type$_1$, $a_1$ type$_1$, EID int*)<br>   Foreign Key (tableC:EID references tableE:ID)<br>   -- or E references C; or R2 has separate table | 2. children tables, parent and entity attributes grouped into one XML column, same foreign keys. |
| 3. tableABC(*ID int, $a_1$ type$_1$, $b_1$ type$_1$, $c_1$ type$_1$,*<br>   *memberBC char, EID int*)<br>   Foreign Key (tableABC:EID references<br>   tableE:ID)<br>   + triggers/stored procedures<br>   -- or E references ABC; or R2 has separate table | 3. one table, one schema for hierarchy, same FK, + triggers/procedures.<br>-- XML as a column of E: never: loose information.<br>-- E as column of ABC with extra constraint.<br>-- E inlined into ABC (in C) if no other relationship |

GENERATING DATABASE SCHEMAS FOR RELATIONAL AND MARKUP LANGUAGE DATA FROM A CONCEPTUAL MODEL

FIELD OF THE INVENTION

The present invention generally relates to the field of databases, and more particularly relates to generating database schemas from a conceptual database model.

BACKGROUND OF THE INVENTION

In response to the widespread use of the XML format for document representation and message exchange, major database vendors support XML in terms of persistence, querying and indexing. With the new option of storing and querying XML in a relational DBMS, data architects face the decision of what portion of their data to persist as XML and what portion as relational data. XML documents and messages pervade enterprise systems such that XML formats have been standardized for data storage and exchange in many industries. While much critical data are still in relational format, practitioners have increasingly turned to XML for storing data that do not fit into the relational model.

In the health care industry, for example, XML is widely used for sharing the metadata of medical records in backend repositories. In one real-world scenario, the schema for the metadata contains over 200 variations in order to support the diverse types of medical documents being persisted and queried. These 200 variant types have a shared common section and specific individual extensions. Persisting such metadata in relational format results in a large number of tables and poor performance. Moreover, adding a new type of document requires many hours of re-engineering the relational schema to accommodate the new type.

In another example, XML is heavily employed in trading systems for representing financial products such as options and derivatives. New types of derivatives are invented every week, which in turn triggers weekly data model changes and hence schema changes. Again, using a relational format requires lengthy database schema changes and data migration, which consequently affect the agility of the business. As those two real cases, enterprises in various industries have turned to XML for greater flexibility and easier maintenance, when compared to relational representation. On the other hand, much legacy data and transactional data remains highly rigid and well-suited for the relational model. It is clear that neither pure relational nor pure XML data management systems will suffice.

As can been seen, although XML is now a first-class citizen in the DBMS, data architects are still unsure of how exactly to persist their data. It is still not trivial to decide what portion of the enterprise data to persist as XML and what portion as relational data. This problem has not been addressed yet and represents a serious need in the industry.

Therefore a need exists to overcome the problems with the prior art as discussed above.

SUMMARY OF THE INVENTION

Briefly, in accordance with the present invention, disclosed are a method, information processing system, and a computer readable medium for generating a plurality of candidate database schemas including relational and mark-up language elements. An information model comprising a plurality of entities and at least one relationship defined there between is received. The information model has been annotated with at least one semantic characteristic, operational characteristic, and evolutional characteristic. The information model that has been annotated is analyzed. A score is associated with each entity based at least in part on attributes associated with each entity in response to the analyzing Each entity is classified as one of a relational element and a mark-up language element in response to associating a score. The information model that has been annotated is partitioned into a plurality of relational element mappings and a plurality of mark-up language element mappings in response to the classifying. A plurality of database schemas associated with the information model that has been annotated is generated in response to the partitioning.

In another embodiment, an information processing system for generating a plurality of candidate database schemas including relational and mark-up language elements is disclosed. The information processing system comprises a memory and a processor that is communicatively coupled to the memory. The information processing also includes a database schema generator that is communicatively coupled to the memory and the processor. The database schema generator is adapted to receiving an information model comprising a plurality of entities and at least one relationship defined there between. The information model has been annotated with at least one semantic characteristic, operational characteristic, and evolutional characteristic. The information model that has been annotated is analyzed. A score is associated with each entity based at least in part on attributes associated with each entity in response to the analyzing Each entity is classified as one of a relational element and a mark-up language element in response to associating a score. The information model that has been annotated is partitioned into a plurality of relational element mappings and a plurality of mark-up language element mappings in response to the classifying. A plurality of database schemas associated with the information model that has been annotated is generated in response to the partitioning.

In yet another embodiment, a computer readable medium for generating a plurality of candidate database schemas including relational and mark-up language elements is disclosed. The computer readable medium comprises instructions for receiving an information model comprising a plurality of entities and at least one relationship defined there between. The information model has been annotated with at least one semantic characteristic, operational characteristic, and evolutional characteristic. The information model that has been annotated is analyzed. A score is associated with each entity based at least in part on attributes associated with each entity in response to the analyzing Each entity is classified as one of a relational element and a mark-up language element in response to associating a score. The information model that has been annotated is partitioned into a plurality of relational element mappings and a plurality of mark-up language element mappings in response to the classifying. A plurality of database schemas associated with the information model that has been annotated is generated in response to the partitioning.

One advantage of the present invention is that a plurality of candidate hybrid relational-XML database schemas can be generated given an annotated information model of the enterprise data. The present invention is advantageous because qualitative properties of the information model such as reuse, evolution, and performance profiles can be considered for deciding how to persist the data. The present invention evaluates an annotated information model of the enterprise data and recommends a plurality of candidate database schema that harmonizes relational and XML data models. A user is then able to choose one or more of the database schemas. The present invention is also advantageous because it frees the user from having to navigate the myriad of confusing options and parameters in order to come up with candidate schema. The present invention can also pick a default schema for the user, while allowing the more savvy user to examine the different candidate schemas.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

FIG. 3 is table with a column of data type XML according to an embodiment of the present invention;

FIG. 5 is a table that summarizes the DDL generation rules for relationships between two entities that do not participate in a hierarchy according to an embodiment of the present invention;

FIG. 8 is an exemplary database table according to an embodiment of the present invention;

FIG. 9 is a table summarizing how relationships within hierarchies are mapped to tables according to an embodiment of the present invention;

DETAILED DESCRIPTION

Figure 1:
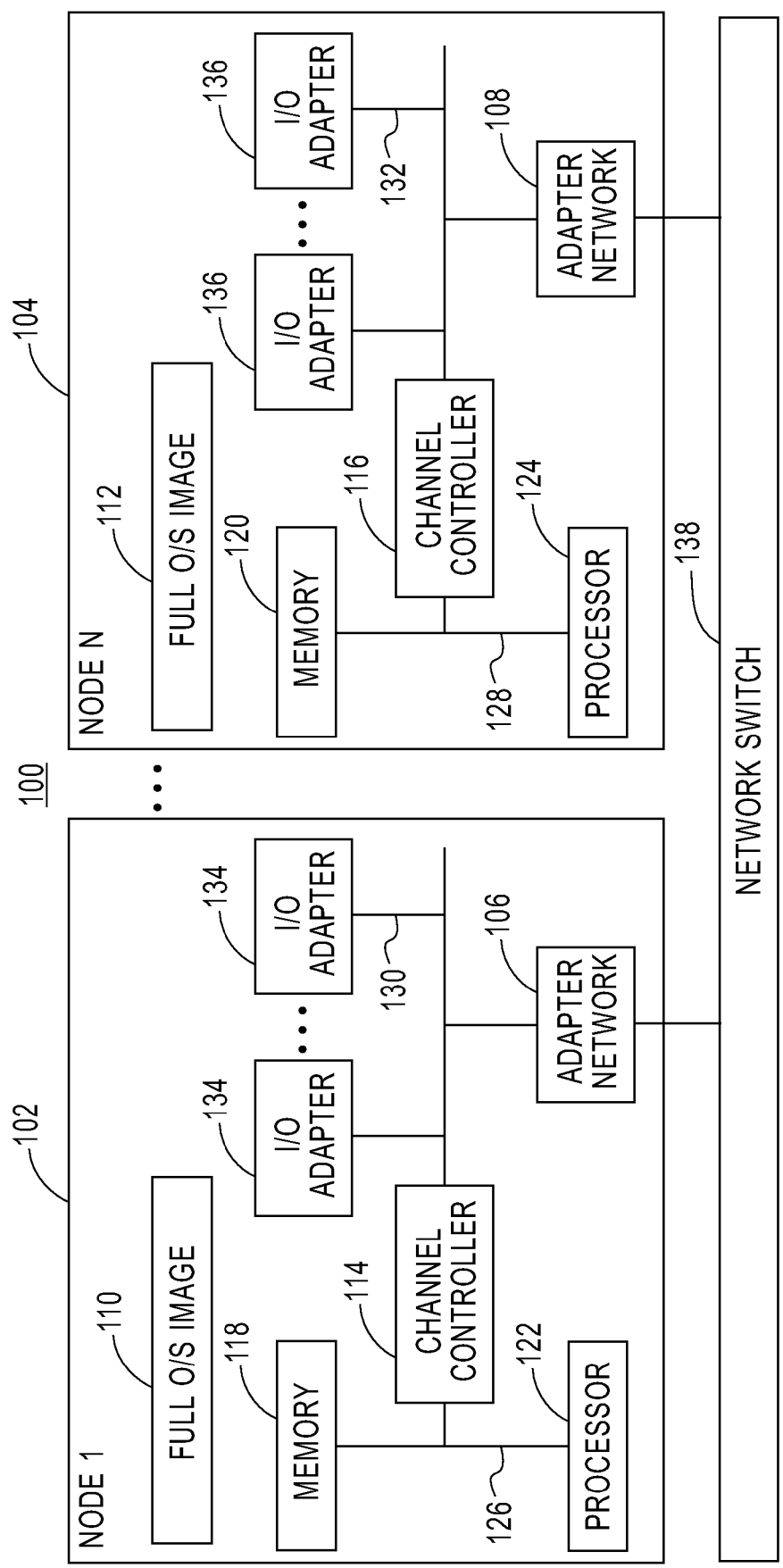
FIG. 1 is a block diagram illustrating an exemplary computing environment, according to an embodiment of the present invention.

The present invention as would be known to one of ordinary skill in the art could be produced in hardware or software, or in a combination of hardware and software. However in one embodiment the invention is implemented in software. The system, or method, according to the inventive principles as disclosed in connection with the preferred embodiment, may be produced in a single computer system having separate elements or means for performing the individual functions or steps described or claimed or one or more elements or means combining the performance of any of the functions or steps disclosed or claimed, or may be arranged in a distributed computer system, interconnected by any suitable means as would be known by one of ordinary skill in the art.

According to the inventive principles as disclosed in connection with the preferred embodiment, the invention and the inventive principles are not limited to any particular kind of computer system but may be used with any general purpose computer, as would be known to one of ordinary skill in the art, arranged to perform the functions described and the method steps described. The operations of such a computer, as described above, may be according to a computer program contained on a medium for use in the operation or control of the computer, as would be known to one of ordinary skill in the art. The computer medium, which may be used to hold or contain the computer program product, may be a fixture of the computer such as an embedded memory or may be on a transportable medium such as a disk, as would be known to one of ordinary skill in the art.

The invention is not limited to any particular computer program or logic or language, or instruction but may be practiced with any such suitable program, logic or language, or instructions as would be known to one of ordinary skill in the art. Without limiting the principles of the disclosed invention any such computing system can include, inter alia, at least a computer readable medium allowing a computer to read data, instructions, messages or message packets, and other computer readable information from the computer readable medium. The computer readable medium may include non-volatile memory, such as ROM, Flash memory, floppy disk, Disk drive memory, CD-ROM, and other permanent storage. Additionally, a computer readable medium may include, for example, volatile storage such as RAM, buffers, cache memory, and network circuits.

Furthermore, the computer readable medium may include computer readable information in a transitory state medium such as a network link and/or a network interface, including a wired network or a wireless network that allows a computer to read such computer readable information. The present invention, according to an embodiment, overcomes problems with the prior art by providing a more efficient mechanism for memory copy operations. The present invention allows the processor to continue executing subsequent instructions during a memory copy operation thereby avoiding unnecessary processor downtime.

Exemplary Computing Environment

FIG. 1 is a block diagram illustrating an exemplary computing environment according to an embodiment of the present invention. In one embodiment, the computing environment 100 of FIG. 1 is used for generating a plurality of hybrid database schemas. It should be noted that the present invention can be scaled across multiple processing nodes such as in the computing environment of FIG. 1 or can reside at a single node.

In the illustrated embodiment, the computing environment 100 is a distributed system in a symmetric multiprocessing ("SMP") computing environment. The computing environment 100 includes processing nodes 102, 104 coupled to one another via network adapters 106 and 108. Each processing node 102, 104 is an independent computer with its own operating system image 110, 112; channel controller 114,116; memory 118,120; and processor(s) 122, 124 on a system memory bus 126, 128. A system input/output bus 130, 132 couples I/O adapters 134,136 and network adapter 106, 108. Although only one processor 122, 124 is shown in each processing node 102, 104, each processing node 102, 104 is capable of having more than one processor. Each network adapter is linked together via a network switch 138. In some embodiments, the various processing nodes 102, 104 are part of a processing cluster.

Information Processing System

Figure 2:
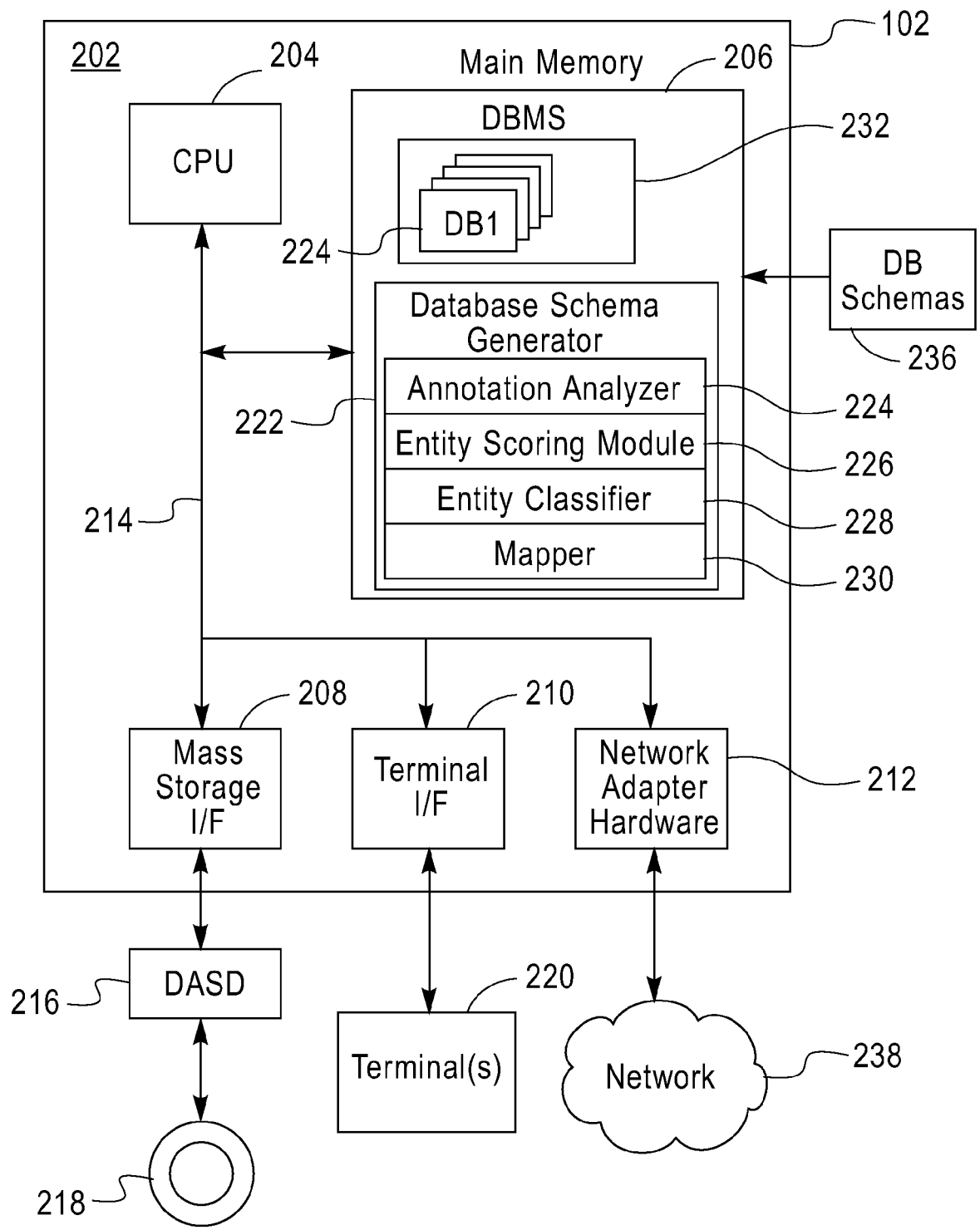
FIG. 2 is a block diagram illustrating and exemplary information processing system environment according to an embodiment of the present invention.

FIG. 2 is a block diagram illustrating a more detailed view of an information processing system 102 according to an embodiment of the present invention. The information processing system is based upon a suitably configured processing system adapted to implement the exemplary embodiment of the present invention. Any suitably configured processing system is similarly able to be used as the information processing system 102 by embodiments of the present invention such as an information processing system residing in the computing environment of FIG. 1, a personal computer, workstation, or the like.

The information processing system 102 includes a computer 202. The computer 202 has a processor 204 that is connected to a main memory 206, mass storage interface 208, terminal interface 210, and network adapter hardware 212. A system bus 214 interconnects these system components. The mass storage interface 208 is used to connect mass storage devices, such as data storage device 216, to the information processing system 102 system. One specific type of data storage device is a computer readable medium such as a floppy disk drive, which may be used to store data to and read data from a CD 218 or a floppy diskette (not shown). Another type of data storage device is a data storage device configured to support, for example, NTFS type file system operations.

The main memory 206, in one embodiment, comprises one or more databases 234 and database management systems ("DBMS") 232. The database(s) 234 can be hybrid databases with relational capabilities and comprehensive native support for mark-up languages such as extensible mark-up language ("XML"). It should be noted that although the present discussion is directed towards XML other mark-up languages can apply. The DBMS 232, in one embodiment, is a hybrid relational-XML DBMS such as the IBM DB2 9 with optimized management of both relational and XML data. In one embodiment the DBMS 232 treats XML as a first-class data type. Moreover, the DBMS 232 supports XML data natively, i.e. XML documents are internally stored in the tree format, following the XML data model. A query processor of the DBMS 232 can handle both SQL and XQuery in a single framework, without translating XQuery statements to SQL. When a document is inserted in a table, it may be associated with a schema.

The same column may have many XML documents associated with different schemas. The DBMS 232 also provides specialized indexes for improving the performance of queries on values, paths and full text. For example, FIG. 3 shows a create table statement 300 for personal information and resume, which is a column of data type XML. After creating the table 300, an index is defined on the value of the element gradschool, which is a sub-element of educ within the resume document. Then, an insert statement populates the table 300 with some values for the relational columns and a document for the XML column. Note that the document is validated against the schemaresume.xsd.

The main memory 206 also comprises a database schema generator 222 ("DSG") for generating a plurality of candidate hybrid database schemas 236 such as relational-XML schemas. The database schema generator 222, in one embodiment, comprises an annotation analyzer 224 for analyzing one or more annotated database information models. The database schema generator 222 also includes a database entity scoring module 226 that associates a scores with each database entity so that an entity classification module 228 can classify each entity as either relational or XML. A mapping module 230 is also included in the database schema generator for mapping database relationships and entity hierarchies to Data Definition Language ("DDL") statements. It should be noted that the methods and processes performed by the database schema generator 222 and its components for generating the plurality of candidate hybrid database schemas 236 is discussed in greater detail below. It should also be noted that one or more of the database(s) 234, the database schema generator 222, and the respective components of the database schema generator 222 can reside on one or more different information processing systems.

Although illustrated as concurrently resident in the main memory 206, it is clear that respective components of the main memory 206 are not required to be completely resident in the main memory 206 at all times or even at the same time. In one embodiment, the information processing system 102 utilizes conventional virtual addressing mechanisms to allow programs to behave as if they have access to a large, single storage entity, referred to herein as a computer system memory, instead of access to multiple, smaller storage entities such as the main memory 206 and data storage device 216. Note that the term "computer system memory" is used herein to generically refer to the entire virtual memory of the information processing system 102.

Although only one CPU 204 is illustrated for computer 202, computer systems with multiple CPUs can be used equally effectively. Embodiments of the present invention further incorporate interfaces that each includes separate, fully programmed microprocessors that are used to off-load processing from the CPU 204. Terminal interface 210 is used to directly connect one or more terminals 220 to computer 202 to provide a user interface to the computer 202. These terminals 220, which are able to be non-intelligent or fully programmable workstations, are used to allow system administrators and users to communicate with the information processing system 102. The terminal 220 is also able to consist of user interface and peripheral devices that are connected to computer 202 and controlled by terminal interface hardware included in the terminal I/F 210 that includes video adapters and interfaces for keyboards, pointing devices, and the like.

An operating system (not shown) included in the main memory is a suitable multitasking operating system such as the Linux, UNIX, Windows XP, and Windows Server 2001 operating system. Embodiments of the present invention are able to use any other suitable operating system. Some embodiments of the present invention utilize architectures, such as an object oriented framework mechanism, that allows instructions of the components of operating system (not shown) to be executed on any processor located within the information processing system 102. The network adapter hardware 212 is used to provide an interface to a network 238. Embodiments of the present invention are able to be adapted to work with any data communications connections including present day analog and/or digital techniques or via a future networking mechanism.

Although the exemplary embodiments of the present invention are described in the context of a fully functional computer system, those skilled in the art will appreciate that embodiments are capable of being distributed as a program product via CD or DVD, e.g. CD 218, CD ROM, or other form of recordable media, or via any type of electronic transmission mechanism.

Information Model

In one embodiment, the present invention is based on the model-driven approach to database design. A user first creates an annotated information model, for example, using a visual editor such as IBM Rational Data Architect for capturing the data requirements. The DSG 222 receives the annotated information model and the annotation analyzer 224 analyzes the model. Based, at least in part, on this analysis, the DSG 222 can recommend candidate schemas to the user.

The following is a discussion with respect to exemplary (i.e., non-limiting) data features and annotations available to a user and utilized by the present invention. The information model, in one embodiment, is presented in a standard format such as Unified Modeling Language ("UML") or Extended Entity-Relationship ("EER") (i.e. ER diagrams with entity inheritance) models. An information model is a conceptual specification of the data and is the result of the first phase in the traditional three step database design methodology (i.e. conceptual design, logical design and physical design). The basic features of a model are well-known and include: entities, attribute names, and types, relationships between entities and semantic constraints (e.g. cardinality and participation constraints). One embodiment of the present invention allows the model to be annotated with other features that are relevant to the hybrid design such as business artifacts, XML messages, schema variability, schema evolution, data versioning, and performance requirements.

Business Artifacts

In enterprise applications, it is common to find data elements naturally grouped into "documents" that are artifacts of business processes. Usually, these artifacts need to be processed as a single unit (e.g. travel expense forms, insurance claims, merchandise invoices) and hence are not normalized across different storage units. Moreover, they often include both structured and free text fields. Considering those factors, there are two main approaches for defining business artifacts within the information model. First, an artifact is modeled as an atomic attribute, preserving its details implicitly within the DBMS 232. Second, the data elements and relationships within a business artifact are modeled explicitly. The main advantage of the latter is that the logical and physical designs can be optimized for accessing the data elements within the artifact. The present invention supports both ways of modeling business artifacts. In one embodiment, entities and relationships that are associated with the same artifact to be explicitly annotated so that the artifact boundaries are defined. The boundaries are specified by assigning a name to the artifact, so that XML entities (and their relationships) that model the same artifact are mapped to only one table with one XML schema. The mapping process is discussed in greater detail below.

XML Messages

Many information systems exchange data via XML messages using a service-oriented architecture (SOA). These XML messages often need to be persisted for audit trail. In terms of conceptual modeling, XML messages are somewhat similar to business artifacts with two important differences. First, data architects often prefer to have the option of persisting these messages as-is in their original XML format. Second, when these messages are to be persisted as XML, their original XML schema are to be used. Therefore, the present invention allows a business artifact to be annotated with its own XML Schema, so that it does not define yet another one (since the original schema for the messages are used for compatibility reasons).

Schema Variability

A data element whose content takes on many variant structural forms is said to have high schema variability. In an information model, schema variability is closely associated with the presence of sparse attributes, optional values, multiple inheritance and derivation. The present invention allows for this type of information to be modeled because schema variability is a key factor on deciding whether an entity is to be persisted as relational or XML. Modeling optional attributes in relational tables requires columns that support NULL values. Moreover, the presence of sparse attributes in the table often results in poor space utilization and sub-optimal query optimization. On the other hand, XML allows those attributes to be modeled and stored easily by including their values only when necessary. In other words, instead of storing NULL values, the elements are just absent in the XML data. Schema variability does not require any additional annotation in the information model other than the minimum cardinality of attributes and entities (0 if it is optional).

Schema Evolution

Very often, it is necessary to adapt the information model for considering changes on the application and user requirements. Usually, an update in the model generates changes on the database schema, then constituting a schema evolution processing. For relational data, schema evolution can trigger adding and deleting entities (tables), attributes (columns), updating data types and names, and relationship constraints. Updating the relational schema of a populated database is not an easy task because it usually requires costly data migration. For XML data, schema evolution often results in changes to the XML schema. In a DBMS that supports XML-schema-agnostic columns (i.e. each document in a column is registered to a different schema or no schema at all), changes in the XML schema do not necessarily require any data migration. Rather, the application needs to be robust over data from different XML schema versions. In one embodiment, highly evolving entities are explicitly annotated in the information model, so that evolving schemas can be chosen for such entities. In principle, any entity may have its design changed, making it hard to predict which entities will evolve. However, with some applications, it is possible to determine at modeling time which entities are likely to evolve such as an entity for derivatives in a financial application. Hence, those entities (whose evolution are certain and frequent) are annotated in the information model.

Data Versioning

Schema evolution deals with changes in the structure of data elements. Data versioning deals with changes within the content of the data itself. Traditional transactional database applications are only concerned with the most up-to-date content. However, many enterprises (e.g. financial applications) require the history of the content changes to be kept for auditing purposes. Efficient versioning control is still a challenge for most commercial relational database management systems ("DBMS"), in spite of the amount of research already published on the subject. On the other hand, with the advance of XML, new, less complex and more performance effective techniques have appeared. Entities or attributes to be versioned need to be explicitly annotated so that our invention can generate the appropriate schemas with additional versioning metadata such as a version identifier.

Performance Critical Elements

Often some critical data elements need to be accessed or updated with much stricter level of response time requirements. Entities involved in such cases may be explicitly annotated in the information model. There are several ways that such annotations can be used. An index advisor can use such annotations as hints for recommending indexes. The DSG 222, in one embodiment, can use such annotations to decide whether to recommend additional materialization or denormalization. In a DBMS where XML access is not as high performing as relational, the DSG 222 can recommend that these entities be materialized in relational format for better partial update performance.

In summary, the DSG 222 considers as input an information model with the following concepts entities, attributes, business artifices, relationships, hierarchies, annotations, and the like. Entities are defined by a name and an optional set of attributes. An entity may be annotated as evolving, versioned and performance critical. Attributes are associated with an entity or a relationship and are defined by a name and a data type. An attribute may also be annotated as optional, multi-valued, versioned or artifact. Multi-valued attributes may also be modeled as independent entities connected to the main entity by one-to-many relationships.

Business artifacts are modeled as regular entities or attributes annotated as artifact. These artifacts may be modeled as (i) atomic entities or attributes with no detail specified, or (ii) decomposed entities and relationships for explicit modeling. In the first case, if artifacts are tightly associated with only one entity, then they are to be modeled as attributes of that entity. Otherwise, they are to be modeled as individual entities. Relationships connect two entities and have name, cardinalities for the involved entities, and an optional set of attributes. Hierarchies connect a parent entity to a derived child entity. The child entity inherits all attributes and relationships of the parent entity.

Figure 4:
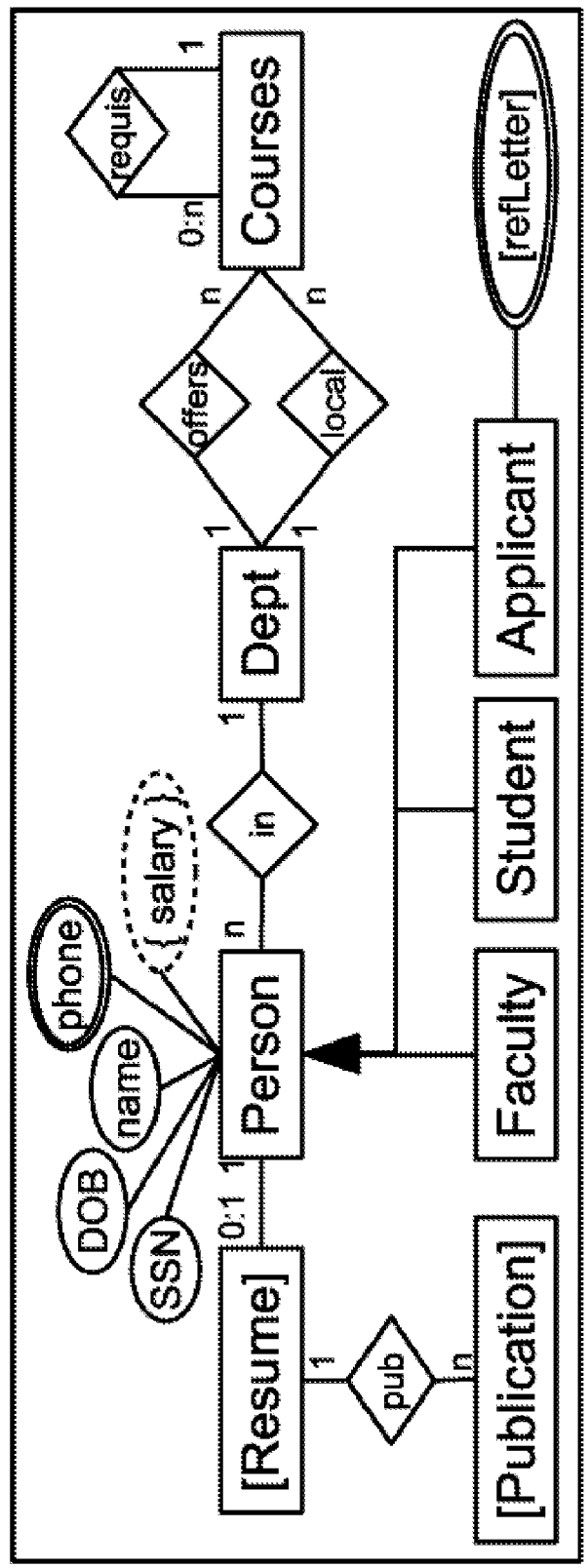
FIG. 4 is an example of an annotated information model according to an embodiment of the present invention.

Annotations are used to tag elements of the information model with additional information (e.g. keywords and/or values) that captures additional user requirements. For example, an entity annotated as evolving and an attribute annotated as versioned. FIG. 4 illustrates a simple academic design as an example of an annotated information model. For clarity reasons, not all attributes are shown and graphic notations are used for identifying annotations. FIG. 4 shows entities as rectangles, attributes as ovals, multi-valued attributes as double-ovals (e.g., phone, refLetter), relationships as diamonds, inheritance with arrow, business artifacts within brackets (e.g., Resume, Publication, refLetter), and versioned attribute within curly brackets (e.g., salary).

A hierarchy is defined with Person as parent entity and Faculty, Student, and Applicant as its children. Attribute salary in Person is optional and annotated as versioned. Entities Person and Applicant have each one multi-valued attribute, phone and refLetter (reference letter), where the latter is also annotated as a business artifact. Entities Resume and Publication are also defined as a business artifact. This example clarifies the choice of leaving the details of a business artifact implicitly, as done in refLetter, and defining the details explicitly, as done in Resume. Such a decision is up to the designer and the consequences of this choice are clarified further below Data Schema Generation Table 1 below shows exemplary pseudo code for the database schema generation process performed by the DSG 222. The pseudo code below only illustrates one non-limiting embodiment of the present invention. The database schema generation process can be separated into three phases. During the first phase, the DSG 222, via the scoring module 226, scores each entity and decides, via the classifier 228, if it is mapped to relational data or XML data. During the second phase the DSG 222, via the mapper 230 refines that classification according to hierarchies, and outputs the DDL statements. During the third phase, the DSG 222, via the mapper 230, processes their relationships and output their DDL statements.

---

Algorithm 1 GENERATEDBSCHEMA(M, t)

---

Input: A Conceptual Model M. and a threshold t
Output: A Set of DDL Statements
1:  for all entities E ∈ M do // phase 1
2:    score -SCOREENTITY(E, M)
3:    if score > t then
4:      type(E) - XML
5:      schema(E) - defSchema(E)

---

-continued

Algorithm 1 GENERATEDBSCHEMA(M, t)

---

// defSchema returns the DDL statements for E
     // if type(E)=XML, it assigns XML schema;
     // it creates a new schema if none annotated yet
6:  else
7:    type(E) - Relational
8:    schema(E) - defSchema(E)
9:  for all hierarchies H ∈ M do // phase 2a
10:   Process H according to section 4.2.4
11:   Output schema(H)
12:   for all entities E ∈ H do
13:     done.add(E)
14: for all entities E ∉ done do // phase 2b
15:   Output schema(E)
16:   done.add(E)
17: for all relationship R ∈ M do // phase 3
18:   Output DDL according to Table 1

---

The DSG 222 classifies each entity as either relational or XML (a relational entity is an entity whose attributes are mapped to relational columns, and an XML entity is one whose attributes are mapped to an XML column). The classification, in one embodiment, is based on the result of the function scoreEntity (line 2), which uses measures of flexibility (discussed in greater detail below). After receiving its score, an entity is classified as relational or XML by employing a user-specified threshold t on the score (lines 3-8). If the score exceeds the threshold, the entity is classified as XML, otherwise as relational. Such a threshold can be loosely interpreted as the percentage of NULL values the data architect is willing to tolerate if an entity is defined as a relational table. It should be noted that the scoring mechanism can be configured so that if the score exceeds the threshold, the entity is classified as relational, otherwise as XML.

An internal map structure schema keeps the DDL statements for creating each entity. The statements are defined by a special function defSchema that receives as input the entity specification from the model (lines 5, 8). If the entity is XML, then the DDL statements create a table with an XML column and also define the XML Schema for that column. The techniques for transforming an information model to XML schemas are well-known and are further discussed in L. Bird A. Goodchild, and T. Halpin. *Object Role Modeling and XML-Schema*. C. Combi and B. Oliboni. *Conceptual Modeling of XML Data*. In Proc of SAS 2006; In Proc. Of ER, 2000; R. Conrad, D. Scheffner, and J. C. Freytag. *XML Conceptual Modeling Using UML*. In Proc. of ER, 2000; R. Elmaasri et al. *Conceptual Modeling For Customized XML Schemas*. In Proc. of ER, 2002; H. Liu Y. Lu, and Q. Yang, *XML Conceptual Modeling with XUML*. In Proc of ICSE, 2006. each of which are hereby incorporated by reference in their entirety. Note that if the XML entity is annotated with a schema already, then that one is assigned to the column. The variable schema is useful because tables may be merged or dropped in the next phases.

The DSG 222 during the second phase outputs the DDL statements that create the entities and is divided in two parts. First, lines 9-13 process the hierarchies of the model as discussed in greater detail below. In summary, there are different ways of mapping a hierarchy to the DBMS 232. The DSG 222 selects a default mapping and presents the alternatives to the user. Whenever the DSG 222 presents alternative schemas, it does so, in one embodiment, by either explaining which scenarios would benefit from each alternative or indicating why there is an alternative to the default option. This information allows a user to make a more appropriate decision. Furthermore, when processing each hierarchy, it may be necessary to merge entities in one table or one XML schema. That is why the output function returns the schema of the whole hierarchy, rather than of each individual entity. Then, lines 14-16 process the remaining entities that do not belong to any hierarchy.

The DSG 222 during the third phase examines each relationship and translates it to the respective DDL statements. Specifically, the DSG 222 examines each relationship (lines 17-18) in the model and generates DDL statements for the resulting schema. One important detail (not shown for clarity reasons) is that the DSG 222 keeps track of the entities that were merged within the previous phase. For example, consider two entities A and B, and a set of relationships R between A and other entities. Also, A and B belong to one hierarchy and were merged so that the columns of A were added to the table for B. In this case, there is no specific table for A anymore. The DSG 222 keeps track that A "became" B and all relationships in R are then directed to B.

The following is a more detailed discussion of the entity scoring process performed by the scoring module 226 in the DSG 222. As discussed above, the DSG 222 via the classifier 228 determines whether an entity in the information model is persisted as relational or XML. In one embodiment, data with high schema variability and sparse data is ideally persisted in XML. Hence, the notion of flexibility to indicate the variability of an entity's structure. An entity is said to be flexible if it has many sparse (optional and multi-valued) attributes. Another way of looking at flexibility is that if a relational table is used for an entity where the columns include all the possible attributes the entity has, then flexibility is a rough measure of the number of NULL values in columns and rows of the table. Conversely, the table for a totally inflexible entity has its columns and rows populated by non-NULL values. Hence, relational tables are better for inflexible entities and XML columns are better for flexible entities. Besides flexibility, the decision to persist in relational or XML also depends on whether an entity is annotated as evolving, business artifact, XML message or performance critical. The DSG 222, in one embodiment, assigns each entity in the information model a score based these criteria.

Table 2 below shows the pseudo code for the scoring process performed by the scoring module 226 of the DSG 222 based on the measure of flexibility and the annotated information.

---
Algorithm 2 SCOREENTITY(E,M)
---

Input: An entity E in a Conceptual Model M
Output: Returns a score for E
  1:  E.attribs ← countAttribs(E)
  2:  E.flex ← countOptAttribs(E)
  3:  E.spec ← countSpecialAttribs(E)
  4:  if specialAnnot(E) then
  5:     E.flex ← E.attribs ---- E. spec
  6:     return 1
      // specialAnnot is true if E annotated as
      // artifact, message, evolving, or versioned
  7:  if criticalAnnot(E) then
  8:     E.flex ← 0 ; E.spec ← 0
  9:     return 0
      // criticalAnnot is true if E annotated as
      // critical performance
10: for all entity P ∈ Parent(E,M) do
11:     attribs ← attribs + P.attribs
12:     flex ← flex + P.flex
13:     spec ← spec + P.spec
14: return ((flex + spec) ÷ attribs)

Specifically, each entity keeps three variables: attribs as the total number of attributes, flex as the measure of flexibility (number of optional and multi-value attributes), and spec as the number of attributes defined as artifact, XML message and versioned. Lines 1-3 assign those values to the entity through functions countAttribs, countOptAttribs, and countSpecialAttribs. Note that the latter does not have to consider those attributes already counted as optional. Lines 4-6 decide if the entity is to be persisted as XML by considering the annotations that define the entity as business artifact, XML message, evolving, versioned. The value of variable flex is updated so that flex+spec=attribs (this is to force the formula at the end of the algorithm to result in 1). Likewise, lines 7-9 decide it is persisted as relational because the entity is defined as performance critical, and the values of flex and spec are updated accordingly. Then, lines 10-13 traverse the hierarchy of the entity (if it exists) in a bottom-up manner and update the entity values by considering the values of its parents.

Note that the prototype main algorithm that calls the score function takes care that each hierarchy is evaluated top-down (so that when it processes line 10, all the parents of the current entity are already processed). Line 14 returns the score value according to a formula that sums up the values for flex and spec and divides the result by attribs. The user can also define different weights for the values of flex and spec to be considered in this formula. For example, considering the academic model from FIG. 4, entity Person has a score 0.4 since it has two out of five attributes defined as multi-valued and optional/versioned. Entities Faculty, Student and Applicant have scores that also consider the score of their parent Person. Entity Resume (independent from the specification of its attributes) has a score 1, because it is defined as business artifact.

FIG. 5 illustrates a table 500 that summarizes the DDL generation rules for relationships between two entities that do not participate in a hierarchy. In the table 500 each relationship R relates two entities A and B. An entity B has attributes $\{b_1, \ldots, b_n\}$ of type $\{type_1, \ldots, type_n\}$. A many-to-many relationship R can also have attributes $\{r_1, \ldots, r_n\}$. For ease of presentation, the primary key of each table is denoted by ID. Each entity has a set of attributes not shown in the table 500. A many-to-many relationship can also have a set of attributes. However, one-to-many (or many-to-one) relationships generally do not have attributes, because attributes that are specific to the relationship can be in-lined into the entity with the larger cardinality.

Each rule is described as follows (considering [A:XML]-0..1-hRi-N-[B:REL] as the textual representation for a relationship R between entities A and B, where A is an XML entity with minimum cardinality of 0 and maximum of 1, and B is a relational entity with cardinality N). For relationships between two relational entities, the mapping to DDL statements is well-known and should be understood by those of ordinary skill in the art. For relationships between an XML entity and a relational entity, there are four main cases.

The first case is [A:XML]-0..1-hRi-1-[B:REL] (each relational instance of B can be related to zero or one instance of A). In the general case, two tables are created, one for each entity. Table A has an XML column with the content of its attributes. The relationship is then established by a foreign key constraint on table A. If A is not involved in any other relationship, it can be in-lined into B as an XML column of B, thus saving one table. the second case is [A:XML]-N-hRi-1-[B:REL] (each relational instance of B can be related to many instances of A). In the general case, two tables are created, one for each entity, and linked through a foreign key constraint into table A. Table A has an XML column for the content of its attributes. If A is not involved in any other relationship, all the instances of A that are related to a particular instance of B can be composed into a single XML document. The resulting document can be in-lined into B as an XML column, thus saving one table. The third case is [A:XML]-1-hRi-N-[B:REL] (each XML instance of A can be related to many instances of B). Similar to the first case, two tables are created and a foreign key constraint establishes their relationship. The fourth case is [A:XML]-M-hRi-N-[B:REL] (many-to-many relationship between A and B). As the counterpart case of pure relational modeling, three tables are created, one for each entity and one for the relationship. The relationship table R contains the relationship's attributes, a foreign key to table A, and a foreign key to table B.

Likewise, for relationships between two XML entities, there are three cases. The first case is [A:XML]-0..1-hRi-1-[B:XML] (each instance of entity B can be related to zero or one instance of A). The second case is [A:XML]-N-hRi-1-[B:XML] (each instance of B can be related to many instances of A). The third case is [A:XML]-N-hRi-1-[B:XML] (many-to-many relationship between A and B). All three cases are similar to their counterparts when only one entity is XML. The difference is that the XML documents from A and B can be merged in one document (BandA, BandSetOfA), except when the relationship is many-to-many. Furthermore, since each entity has its schema specified (in phases 1 and 2 of Algorithm 1), if the entities are merged when mapping the relationships, so are their schemas. In this case, there are two main options: (i) XML entity becomes an individual column within another entity, then its schema is assigned to the respective column as well; (ii) XML entity is merged with another XML entity in one column (for both entities), then their schemas are merged into one and assigned to the respective column. Note that merging is not recommended if the XML entities have other relationships (to different entities). In this case, they stay in separate tables with a primary key so that the other incident relationships can refer to the respective entities easily.

The above discussion illustrated one embodiment for mapping simple entities and relationships to DDL statements. However, the mapper 230 in the DSG 222 can also map entities and relationships that involve entity hierarchies to DDL statements. One problem with mapping hierarchies to a pure relational schema has been studied by the Object-Relational DBMS community and addressed by several commercial products (e.g. Object-Relational mapping systems such as Oracle's Toplink and Hibernate). The mapping of the present invention differs from previous work in that the entity hierarchies are not mapped to a pure relational schema, but to a hybrid or mixed relational XML schema. Mapping to a hybrid schema introduces the extra flexibility of having parts of the hierarchy as relational schema and others as XML schema.

In one embodiment, it is assumed that each hierarchy may be further specified with disjoint-ness and completeness constraints. The first constraint specifies that the specialization is either disjoint (a parent instance belongs to at most one of the child entities) or overlapping (it may belong to more than one child entity). The second constraint specifies that the specialization is either total (a parent instance must belong to some child entity) or partial (it may belong to the parent only). The DSG 222 considers that a specialization is total disjoint by default. Considering these features, the translation of hierarchies to DDL statements is divided into two parts: (i) mapping entities to tables, and (ii) mapping the relationships between entities.

Figure 6:
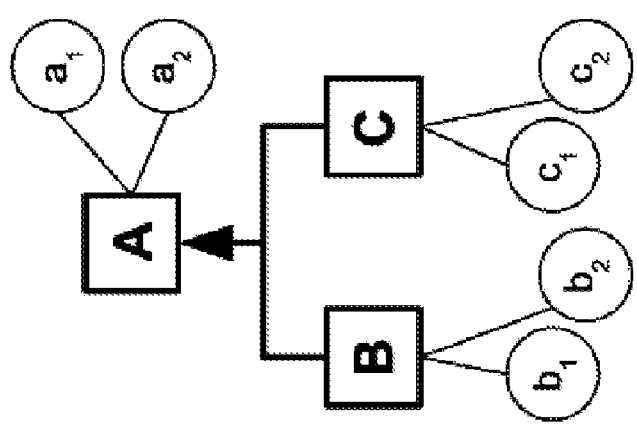
FIG. 6 is an example of a generic entity hierarchy with four possible mappings to a database schema according to an embodiment of the present invention.

Considering only the relational case, there are four basic ways for mapping a hierarchy to a database schema, as illustrated in FIG. 6. Each way of mapping may be more suitable for one type of hierarchy. Additionally, each mapping has its advantages and disadvantages. Method 1 maps each entity to an individual table. It preserves each entity individually at the cost of processing multiple joins when querying for attributes from different entities.

Method 2 creates tables only for the leaves of the hierarchy, then mapping the attributes of the parent entities to each of its children. It solves the join problem at the cost of replicating information of the parent and processing an outer union for recovering all instances of the parent. Method 3 maps the whole hierarchy to one table and adds a control attribute in order to identify to which child entity the instance belongs. It requires no join or outer union to retrieve any of the entities but leads to many NULL values in the subclasses attributes. Method 4 is similar to the previous one, but it has one control attribute for each child (usually a Boolean value). It also does not require join or outer union and will probably have less NULL values when the specialization is overlapping. In one embodiment, the DSG 222 chooses by default method 1 for mapping relational hierarchies, and presents the other methods as alternatives according to the hierarchy constraints. Finally, the impact of those options on the mapping of relationships is discussed in greater detail below.

For hierarchies composed by XML entities, the DSG 222 decides how to map the entities to XML columns and then it defines an XML schema for each of those columns. Similar to the relational case, there are three options: (i) mapping each entity to its own table; (ii) mapping the leaves to tables; and (iii) mapping the whole hierarchy to one table. The first and the second options define the tables and foreign keys as the relational counterparts. The difference is that each table has one XML column associated to the respective XML schema. The third option creates a unique table with one XML column associated to one schema. The DSG 222, in one embodiment uses the approach discussed in R. Al-Kamha, D. W. Embley, and S. W. Liddle. *Representing Generalization/Specialization in XML Schema*. In Proc. EMISA, 2005, which is hereby incorporated by reference in its entirety, for defining the XML schema for the second and third options.

For example, for the hierarchy in FIG. 6, the DSG 222 defines complex types A, B, and C where B and C are derived by extension from A. Depending on the hierarchy constraints, A is abstract (total) or not (partial), and the identifier is unique among the types (disjoint) or not (overlapping). The combinations of constraints entail matching those features. For example, a total disjoint hierarchy is mapped to XML schema by having the parent entity as an abstract type and unique identifiers among all complex types defined for that hierarchy. This approach works well because the XML model is made for data with hierarchical structure. Nevertheless, merging the whole hierarchy within one document may not be the user's intention. In fact, considering the other properties of the hierarchy and the relationships within it, it may be a better option to define one table for each entity or one table for each child. Hence, the DSG 222 deals with these three options by having the third one (unique XML schema) as default option, and presenting the other two as alternatives.

While mapping entities follows deterministic methodologies, mapping the relationships of the entities within a hierarchy is more challenging. Furthermore, although the DSG 222 uses approaches based on R. Al-Kamha, D. W. Embley, and S. W. Liddle. *Representing Generalization/Specialization in XML Schema*. In Proc. EMISA, 2005 a standard procedure for mapping hierarchies with relationships to database schemas currently does not exist. Given an entity hierarchy composed of relational entities, XML entities or both, the problem is how to properly map the constraints imposed by the relationships defined for those entities.

Figure 7:
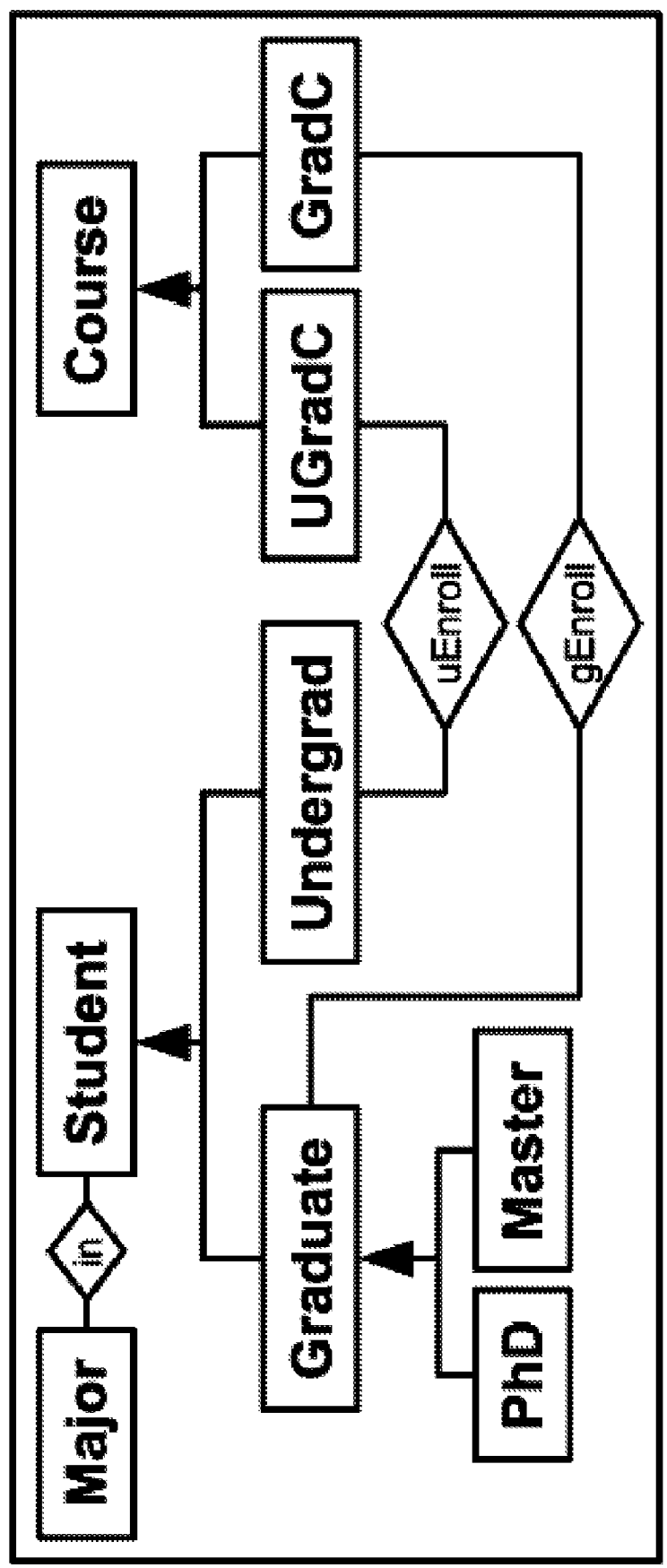
FIG. 7 is an example of an Extended Entity-Relationship diagram according to an embodiment of the present invention.

One solution is to apply the mappings from Table 500 in FIG. 5 to the entities on the hierarchy. However, due to the inheritance constraints established by a hierarchy, the mappings from Table 500 may not be able to be directly applied. Therefore, a discussion of the challenges imposed by three main scenarios and their variations. The scenarios are discussed considering the EER diagram 700 in FIG. 7, a partial view of an academic system. There are two entity hierarchies, one for students, and one for courses, where attributes are omitted for clarity purposes. Graduate students enroll only on graduate courses and undergrad students on undergrad courses, and each student is in a major. Other factors are considered for mapping each scenario. Specifically, the DSG 222 maps hierarchies composed of relational entities, XML entities and sometimes both. It also evaluate the hierarchy constraints of disjoint-ness and completeness. Clearly, the main challenge is to solve each of the possible combinations of scenario, type of entity within the hierarchy and type of hierarchy constraint. Hence for each hierarchy within the model, the DSG 222 proceeds as follows: first, it identifies which levels of the hierarchy have relationships (i.e. identifies one of the three scenarios); second, it checks whether the entities within the hierarchy are all relational, all XML or mixed; last, it verifies the type of hierarchy (total/partial, disjoint/overlapping) and proposes candidate schemas accordingly.

The first scenario, Parent Relationships, presents the parent entity with relationships and the children with none. This scenario is illustrated by the hierarchy defined by entities Graduate, PhD, and Master in FIG. 7 (the entity Student is disregarded for a moment). The entity Graduate has a relationship gEnroll with entity GradC, and its children have no relationship. In this case, students on both PhD and Master may also enroll in graduate courses, since the classes inherit such relationship. Effectively, the entire hierarchy subtree rooted at Graduate is considered as a single entity with respect to the relationship gEnroll.

As already discussed, different solutions may be proposed according to the hierarchy participants and constraints. First, consider that all entities in the hierarchy are relational. In this case, mapping the relationships is similar to mapping the entities, where the four mappings presented in FIG. 6 may be applied regarding the relationship as a regular attribute. Specifically, defining individual tables for each entity (method 1) has the advantage that the relationship relates to the parent table and no other mapping is necessary. On the other hand, defining tables only for the children (method 2) has the disadvantage that the relationship needs to relate to each of the children (since there is no table for the parent). Merging the hierarchy in one table (methods 3 and 4) requires that the relationship be related to the one table itself, and no other mapping is necessary.

Mapping the relationships when the hierarchy is composed of XML entities also depends on the way the hierarchy is mapped. Defining the hierarchy as one table Graduate (the default option for XML hierarchy) or three individual tables (one per entity) implies that the relationship gEnroll relates directly to Graduate. Then, no additional constraint is necessary. Defining tables only for the children results in the same problem as the relational case. In both cases (relational and XML hierarchies), having tables only for the children when there is a relationship with the parent is not the best idea. Therefore, when presenting such mapping as an alternative, this warning is presented as well. Finally, the default option is to keep the tables for Graduate separated from those with which it has relationships. However, when the whole hierarchy is mapped to one XML column, it can also be merged with the related entity. This merging can only happen on the following situations: (i) the parent has only one relationship, then it can be merged as a column on the related entity; or (ii) the parent has other relationships, but the related entity has only this one, then it can be merged to the parent table.

The second, Children Relationships, presents the opposite case, where the child entities have relationships and the parent has none. An illustration of this scenario is the hierarchy defined by entities Course, UGradC, and, GradC, where each child entity has one relationship. Having a relational hierarchy, the relationships are mapped similar to the previous scenario. Defining individual tables for each entity is easier and no other mapping is necessary. Defining tables only for the children may be even better, since the parent has no other relationship. Merging the hierarchy as one table is more complicated. In this case, it is necessary to specify additional check constraints in order to verify the correctness of the relationship. For example, according to either method 3 or 4 from FIG. 6, the entities Course, UGradC, and, GradC are then merged into one table CourseUG. The information model specifies relationship gEnroll in which instance of the entity Graduate relates only to instances of GradC (now merged into CourseUG). In order to preserve the information model specification, defining the relationship gEnroll to entity CourseUG an extra check constraint is used to assure the related instance in CourseUG has the control attribute defining the instance as member of GradC.

Figure 8:
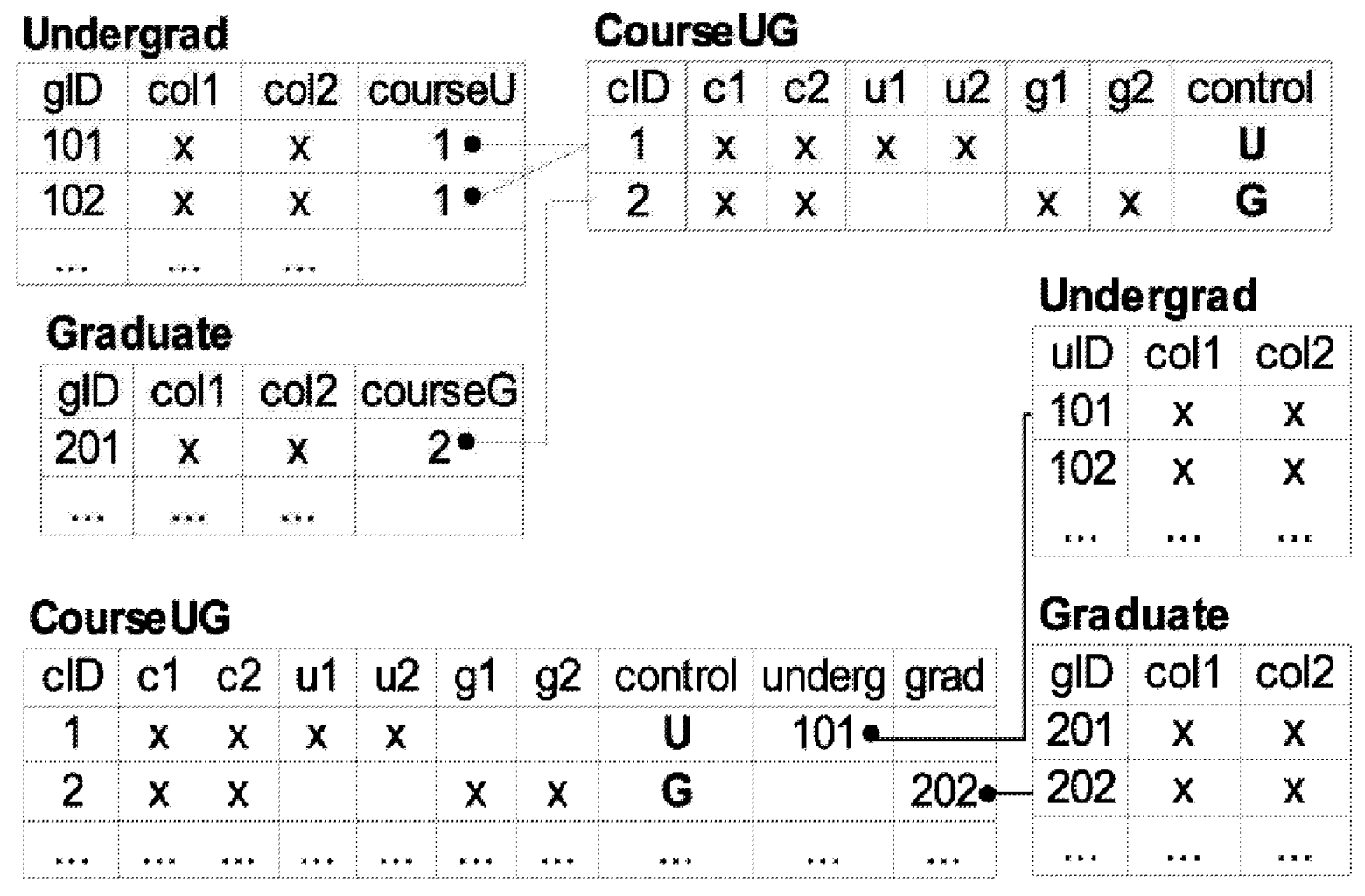

In this case, FIG. 8 illustrates two alternatives. Even though gEnroll and uEnroll are N-to-M relationships, this figure has the mappings of 1-to-N relationships, for the sake of discussion. In the first case (within the shaded area), the student tables refer to CourseUG. The referential integrities specified by the foreign keys on those tables simply ensure that courseU and courseG refer to rows on table CourseUG. The question is how to specify that the row referred by courseU (within CourseUG) has the control value equal to 'U'. As an illustration, on IBM's DB2, a check constraint only refers to values on the same table. Hence, a solution in DB2 is to specify the condition within triggers and stored procedures, which is what the present invention does. The same problem arises when the foreign keys go on reverse, from CourseUG to the student tables as illustrated at the bottom of FIG. 8. In this case, CourseUG has two foreign keys, one for Undergrad and other for Graduate. The procedure needs to specify that if control is 'U' then the foreign key for Graduate is null. Otherwise, if control is 'G' then the foreign key for Undergrad is null. Now, consider a hierarchy composed of XML entities. As the relational case, mapping each entity or each child to individual tables presents no problem for the relationship constraints. On the other hand, mapping the hierarchy to one document within a table presents the same concerns as the relational case. The solution is to define triggers and stored procedures for the XML tables as well.

The third scenario, Parent and Children Relationships, combines the previous ones such that both parent and child entities have different relationships. An illustration of this scenario is the hierarchy composed of entities Student, Graduate and Undergrad, and it is necessary to preserve the constraints entailed by all relationships at the same time. Therefore, the first mapping with individual tables is probably the easiest one, since the relationships will relate the respective entity tables. Defining tables only for the children may incur in update anomalies due to the redundancy of the parent information stored into the children tables. Collapsing the hierarchy in one table is equally complicated because additional checking is necessary to verify the correctness of the relationship. All these problems happen to both relational and XML hierarchies. Therefore, in this case, the default option adopted by our invention is to keep each entity in an individual table in order to preserve the relationships. However, the other options and the required triggers and stored procedures may also be presented to the user, with their respective pros and cons.

This variability in how entity hierarchies are mapped to database schema is partly a modeling problem and partly a mapping problem. A user may prefer to model the hierarchy flattened to the children or as individual entities, which is a modeling decision. When a user model the whole hierarchy with individual entities, then mapping it to individual tables or flattening it to children tables is a mapping decision. The schema advisor must support both ways of designing the tables, which results in more candidate schemas. Hence, when a hierarchy is defined (i.e. the user chose to model the hierarchy composed of individual entities), the default approach for mapping it to the schema is to keep individual tables. Moreover, our invention allows the user to set up the default as defining children tables or unique tables as well. Finally, Table 900 in FIG. 9 has a summary of the mapping possibilities. It shows only the scenarios for parent relationships and children relationships, because the third scenario (both have relationships) is a merge of those two. The table has the options separated by relational and XML hierarchies, and by the three possible entity mappings (the fourth method is the same as the third one with more control attributes).

Process of Generating Database Schemas

Figure 10:
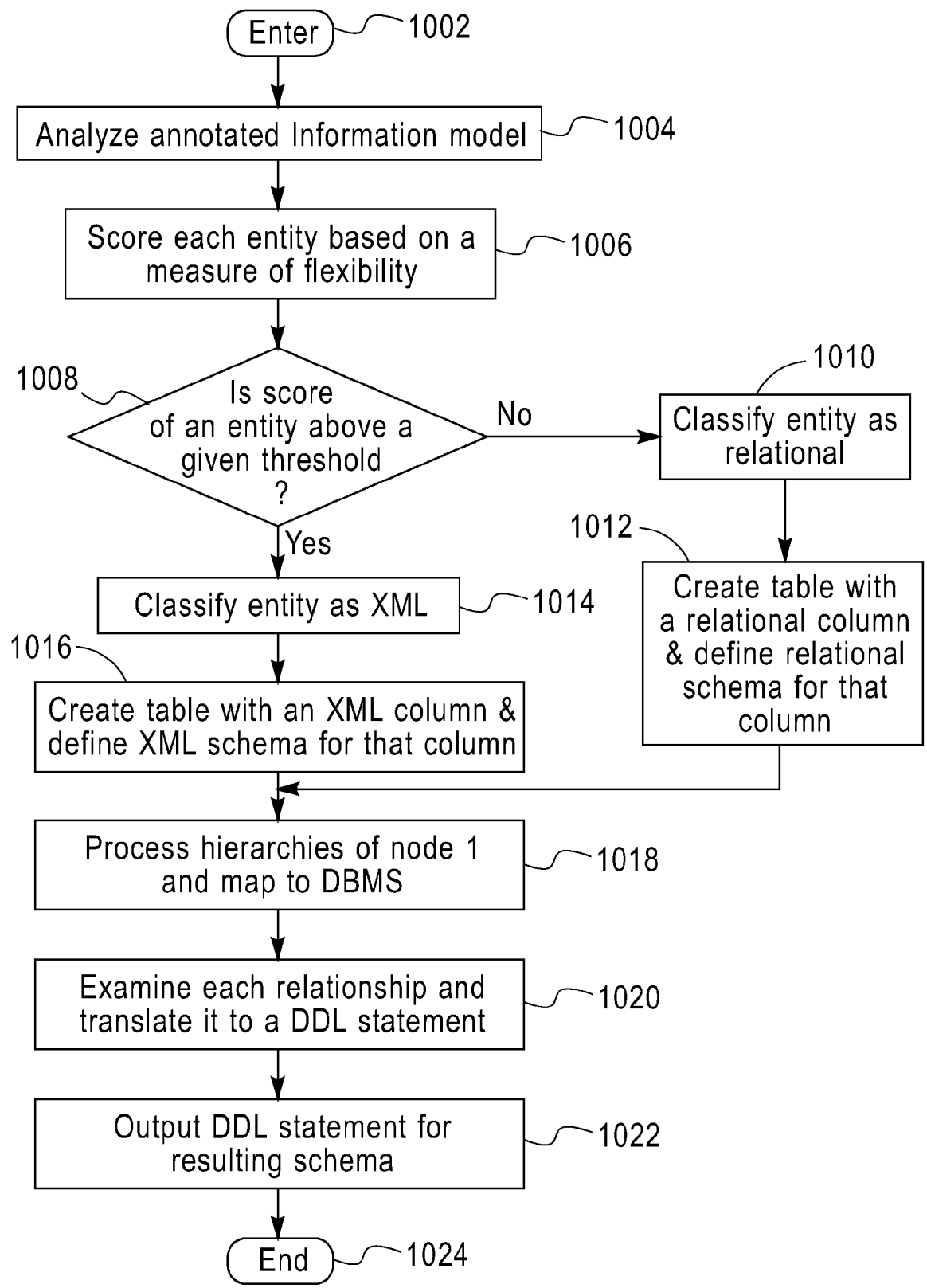
FIG. 10 is an operational flow diagram illustrating a process of generating database schemas according to an embodiment of the present invention.

FIG. 10 shows a process of generating database schemas from a conceptual database model. The operational flow diagram of FIG. 10 begins at step 1002 and flows directly to step 1004. The DSG 222, at step 1004, analyzes an annotated information model, which has been discussed above. The DSG 222, at step 1006, scores each entity based on a measure of flexibility, which has been discussed above. The DSG 222, at step 1008, determines if the entity's score is above a given threshold. If the result of this determination is negative, the DSG 222, at step 1010, classifies the entity as relational. The DSG 222, at step 1012, creates a table with a relational column and defines a relational schema for that column. The control flows to step 1018.

If the result of the determination at step 1008 is positive, the DSG 222 classifies the entity as XML. The DSG 222, at step 1016, creates a table with an XML column and defines an XML schema for that column. The DSG 222, at step 1018, processes hierarchies of the annotated information model and maps the hierarchies to the DBMS 232. The DSG 222, at step 1020, examines each relationship in the annotated information model and translates it to a DDL statement. The DSG 222, at step 1022, then outputs a DDL statement for the resulting schema. The control flow exits at step 1024.

Process of Scoring Entities

Figure 11:
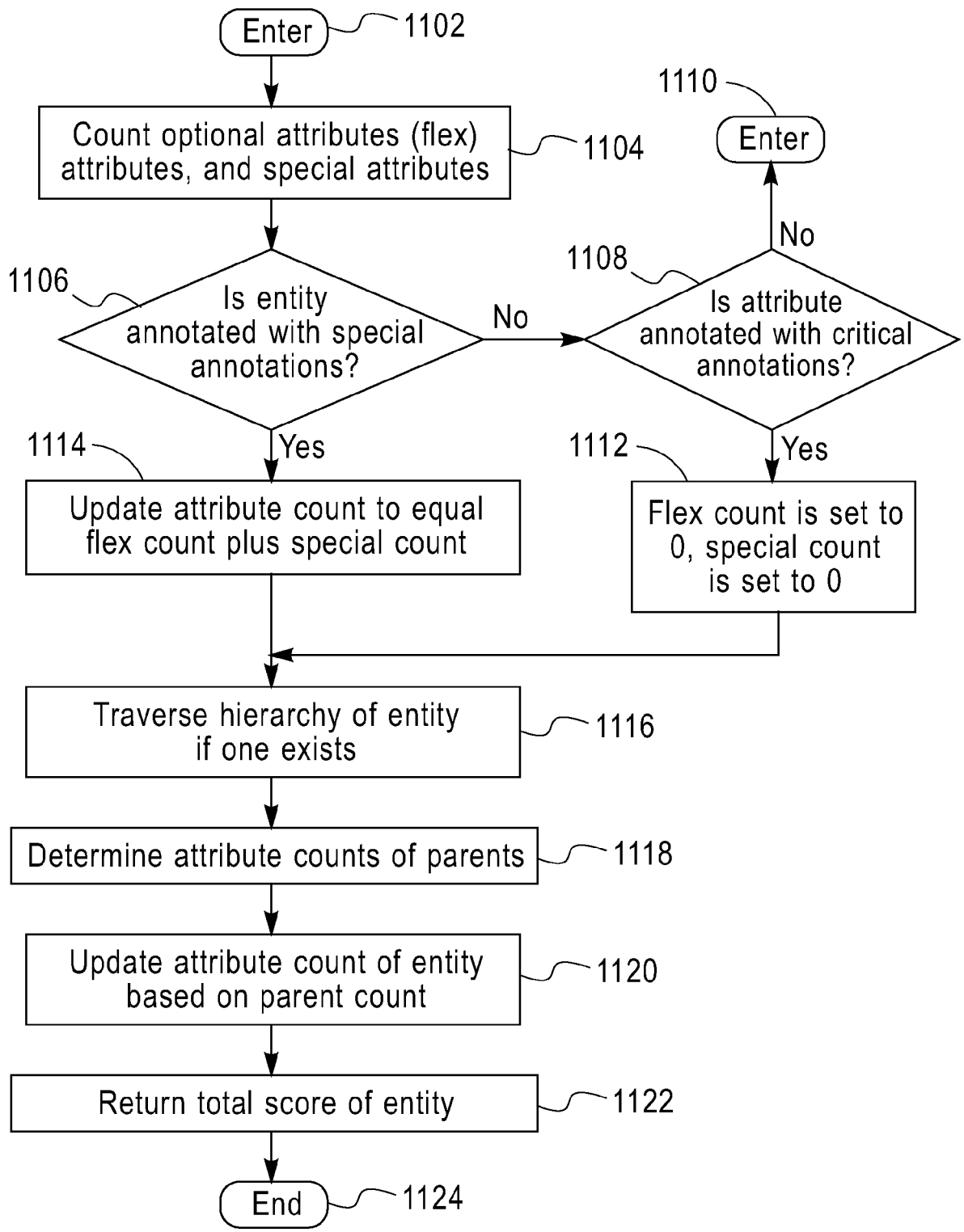
FIG. 11 is an operational flow diagram illustrating a process scoring entities according to an embodiment of the present invention.

FIG. 11 shows a process of scoring entities. The operational flow diagram of FIG. 11 begins at step 1102 and flows directly to step 1104. The DSG 222, at step 1104, assigns values to each entity. For example, the DSG 222 assigns an attribute value (attrib), which is the total number of attributes; a flex value, which is the measure of flexibility (i.e., number of optional and multi-value attributes); and a special value (spec), which is the number of attributes defined as artifact, XML message, and versioned. The DSG 222, at step 1106, determines if the entity is annotated with special annotations such as business artifact, XML message, evolving, versioned, and the like. If the result of this determination is positive, the DSG 222, at step 1114, updates the flex variable so that flex+spec=attribs.

If the result of the determination at step 1106 is negative, the DSG 222, at step 1108, determines if the attribute is annotated with critical annotations, such as performance critical annotations. If the result of this determination is negative, the control flow ends at step 1110. If the result of this determination is positive, the DSG 222, at step 1112, sets the flex count and spec count equal to 0. The DSG 222, at step 1116, traverses the hierarchy of the entity (if one exists) in a bottom-up manner. The DSG 222, at step 1118, determines the attribute counts of the parents and updates, at step 1120, the entity values based on the parent attribute count. The DSG 222, at step 1122, returns the total score of the entity. The control flow then exits at step 1124.

Non-Limiting Examples

The present invention can be realized in hardware, software, or a combination of hardware and software. A system according to a preferred embodiment of the present invention can be realized in a centralized fashion in one computer system or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein.

In general, the routines executed to implement the embodiments of the present invention, whether implemented as part of an operating system or a specific application, component, program, module, object or sequence of instructions may be referred to herein as a "program." The computer program typically is comprised of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method, with an information processing system, for generating a plurality of candidate database schemas including relational and mark-up language elements, the method comprising:

receiving an information model comprising a plurality of entities and at least one relationship defined there between, wherein the information model has been annotated with at least one semantic characteristic, operational characteristic, and evolutional characteristic;

analyzing the information model that has been annotated;

associating a score, in response to the analyzing, with each entity based at least in part on attributes associated with each entity;

classifying, in response to associating a score, each entity as one of a relational element and a mark-up language element;

partitioning, in response to the classifying, the information model that has been annotated into a plurality of relational element mappings and a plurality of mark-up language element mappings; and generating, in response to the partitioning, a plurality of database schemas associated with the information model that has been annotated.

2. The method of claim 1, wherein the mark-up language is Extensible Mark-Up Language.

3. The method of claim 1, wherein the classifying further comprise:

comparing the score associated with each entity to a given score threshold; wherein if the score associated with an entity is above the given score threshold, classifying the entity as one of a relational element and a mark-up element, and wherein if the score associated with an entity is below the given score threshold, classifying the entity as an element type that has not been used to classify the entity when the score is above the given score threshold.

4. The method of claim 1, wherein the partitioning further comprises:

generating for each entity classified as a mark-up language element a table comprising a mark-up language column; and defining a mark-up language schema for the column.

5. The method of claim 1, wherein the partitioning further comprises:

generating for each entity classified as a relational element a table comprising a relational column; and defining a relational schema for the column.

6. The method of claim 1, further comprising:

automatically selecting a default database schema from the plurality of database schemas; and presenting database schemas which were not selected to a user.

7. The method of claim 1, wherein information model is annotated with schema flexibility constraints.

8. The method of claim 1, wherein information model is annotated with schema evolution constraints.

9. The method of claim 1, wherein information model comprises at least one model element that is a mark-up language message and has been annotated.

10. The method of claim 1, wherein information model comprises at least one model element that is a business artifact and has been annotated.

11. The method of claim 1, wherein information model includes at least one model element that has been annotated with constraints on a granularity for reuse associated with the model element.

12. The method of claim 1, wherein information model includes at least one model element that has been annotated with at least one version requirement.

13. The method of claim 1, wherein information model includes at least one model element that has been annotated with performance criteria.

14. The method of claim 1, wherein the associating a score further comprises:

determining a number of total attributes associated with an entity;

determining a number of optional attributes and multi-value attributes associated with the entity; and determining a number of attributes associated with the entity that are designated as one of artifact, mark-up language message, and versioned.

15. An information processing system for generating a plurality of candidate database schemas including relational and mark-up language elements, the information processing system comprising:

a memory;

a processor communicatively coupled to the memory; and a database schema generator communicatively coupled to the memory and the processor, wherein the database schema generator is adapted to:

receiving an information model comprising a plurality of entities and at least one relationship defined there between, wherein the information model has been annotated with at least one semantic characteristic, operational characteristic, and evolutional characteristic;

analyzing the information model that has been annotated;

associating a score, in response to the analyzing, with each entity based at least in part on attributes associated with each entity;

classifying, in response to associating a score, each entity as one of a relational element and a mark-up language element;

partitioning, in response to the classifying, the information model that has been annotated into a plurality of relational element mappings and a plurality of mark-up language element mappings; and generating, in response to the partitioning, a plurality of database schemas associated with the information model that has been annotated.

16. The information processing system of claim 15, wherein the classifying further comprises:

comparing the score associated with each entity to a given score threshold; wherein if the score associated with an entity is above the given score threshold, classifying the entity as one of a relational element and a mark-up element, and wherein if the score associated with an entity is below the given score threshold, classifying the entity as an element type that has not been used to classify the entity when the score is above the given score threshold.

17. The information processing system of claim 15, wherein the partitioning further comprises:

generating for each entity classified as a mark-up language element a table comprising a mark-up language column;

defining a mark-up language schema for the column;

generating for each entity classified as a relational element a table comprising a relational column; and defining a relational schema for the column.

18. A computer readable medium for generating a plurality of candidate database schemas including relational and mark-up language elements, the computer readable medium comprising instructions for:

receiving an information model comprising a plurality of entities and at least one relationship defined there between, wherein the information model has been annotated with at least one semantic characteristic, operational characteristic, and evolutional characteristic;

analyzing the information model that has been annotated;

associating a score, in response to the analyzing, with each entity based at least in part on attributes associated with each entity;

classifying, in response to associating a score, each entity as one of a relational element and a mark-up language element;

partitioning, in response to the classifying, the information model that has been annotated into a plurality of relational element mappings and a plurality of mark-up language element mappings; and generating, in response to the partitioning, a plurality of database schemas associated with the information model that has been annotated.

19. The computer readable medium of claim 18, wherein the instructions for classifying further comprise instructions for:

comparing the score associated with each entity to a given score threshold; wherein if the score associated with an entity is above the given score threshold, classifying the entity as one of a relational element and a mark-up element, and wherein if the score associated with an entity is below the given score threshold, classifying the entity as an element type that has not been used to classify the entity when the score is above the given score threshold.

20. The computer readable medium of claim 18, wherein the instructions for partitioning further comprise instructions for:

generating for each entity classified as a mark-up language element a table comprising a mark-up language column;

defining a mark-up language schema for the column;

generating for each entity classified as a relational element a table comprising a relational column; and defining a relational schema for the column.

* * * * *